No. 842,292. PATENTED JAN. 29, 1907.
J. E. ALLEN.
SHEARS.
APPLICATION FILED OCT. 16, 1906.

John E. Allen.
Inventor

Witnesses
Arthur Wesley
M. A. Schmidt

By Wm. B. Stevens Co.
Attorneys

UNITED STATES PATENT OFFICE.

JOHN E. ALLEN, OF YONCALLA, OREGON.

SHEARS.

No. 842,292.  Specification of Letters Patent.  Patented Jan. 29, 1907.

Application filed October 16, 1906. Serial No. 339,198.

*To all whom it may concern:*

Be it known that I, JOHN E. ALLEN, a citizen of the United States, residing at Yoncalla, in the county of Douglas and State of Oregon, have invented new and useful Improvements in Shears, of which the following is a specification.

This invention relates to shears, and has for its object to provide means for holding the blades in contact with each other, thus preventing lateral spreading thereof and making them self-sharpening and also resulting in a clean cut.

Figure 1:
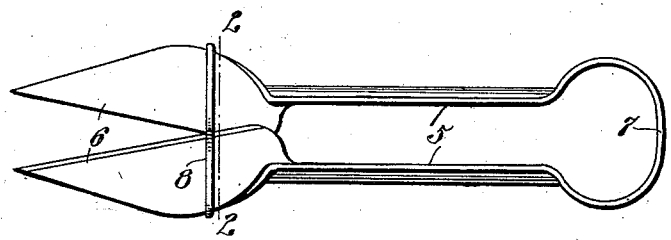
Figure 2:
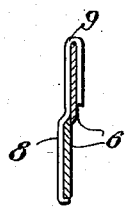

In the accompanying drawings, Figure 1 is an elevation of the invention, and Fig. 2 is a section on the line 2 2 of Fig. 1.

Referring specifically to the drawings, 5 denotes the shanks of the shears, which are formed at one end with cutting-blades 6 and at the opposite ends are connected by a spring 7 in the usual manner. To the outside of one of the blades is soldered or otherwise secured the shank 8 of a hook 9, which extends over the back edge of the other blade and along the outside thereof. The shank is parallel to the hook and extends along the opposite side of the blade. The blade fits snugly between the shank and the hook, and is thus held in close relation to the other blade. This prevents the blades from spreading laterally and also makes them self-sharpening. The hook also limits the opening movement of the blades.

I claim—

The combination with a shears, of a hook extending over the back edge of one of the blades and along the outside thereof, and having a parallel shank extending along the opposite side of said blade, and secured to the other blade.

In testimony whereof I have signed my name to this specification in the presence of two subscribing witnesses.

JOHN E. ALLEN.

Witnesses:
 W. S. FEGLES,
 CHAS. SUMMERS.